Dec. 4, 1934.  J. A. BENT  1,982,630
METHOD OF WIRE BINDING
Filed June 5, 1933
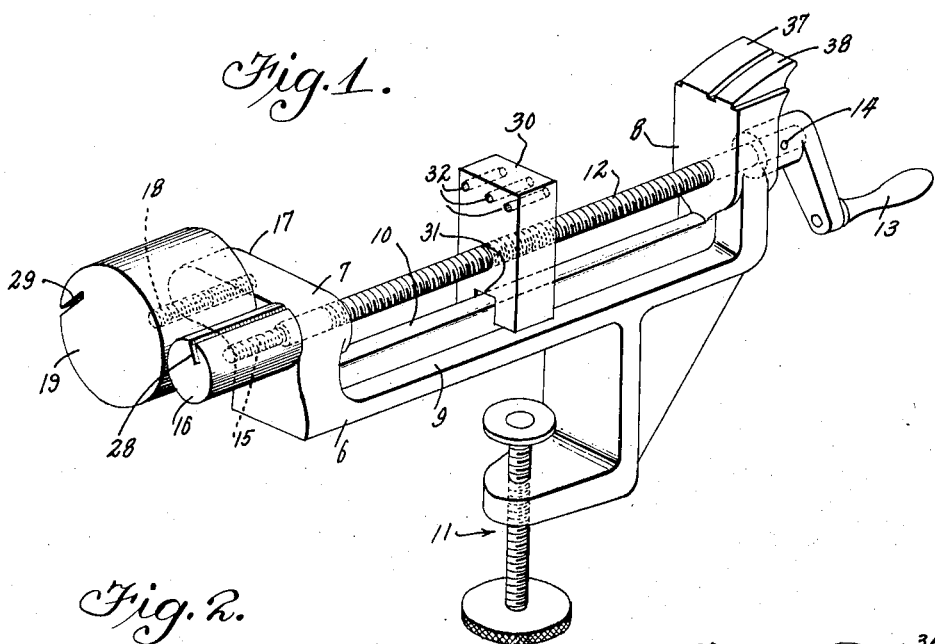
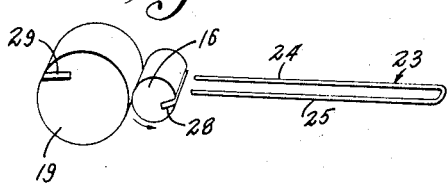
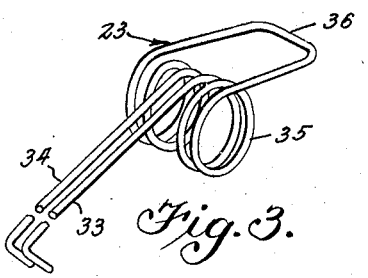
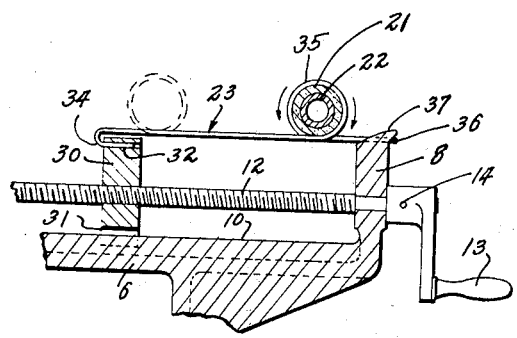
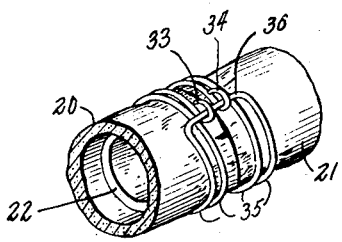
Inventor
Jesse A. Bent
By Lyon & Lyon
Attorneys Patented Dec. 4, 1934

1,982,630

UNITED STATES PATENT OFFICE 1,982,630

METHOD OF WIRE BINDING

Jesse A. Bent, Los Angeles, Calif., assignor of one-third to S. Q. Shannon and one-third to Lolita M. Hinds Application June 5, 1933, Serial No. 674,333

10 Claims. (Cl. 140—93)

This invention relates to a method of wire binding and is particularly adaptable for tightly banding hose ends with wire so as to securely clamp the hose end upon a suitable coupling, bushing or the like.

The invention has been illustrated and will be described in connection with binding hose ends with wire but it is to be understood that this is only one use for which the invention may be advantageously practiced.

A further object is to provide a method of tightly binding an object with wire by first encircling the object to be bound with one or more loops of wire, pulling the free ends of the wire coils taut, rolling the object along the taut wire for tensioning the coiled loops tightly about the object, to repeat the wire tensioning and rolling operations as many times as may be necessary to draw the coiled loops about the object to a desired tension, and thereafter fastening the wire ends together and severing the surplus wire from the tie.

It is to be understood that the method may be carried out by devices differing materially from the preferred of such devices hereinafter described.

In the drawing:

Figure 1 illustrates a perspective view of a preferred form of device for carrying out the method of this invention.

Figure 2 illustrates a somewhat diagrammatic representation of the coiling rolls and a wire staple about to be inserted in the groove of one of the coiling rolls prior to the coiling operation. This operation forms a hook upon each of the free ends of the staple while forming the coil.

Figure 3 illustrates in perspective the coiled wire staple just after the free ends have been straightened and the hooked portions thereof have been severed therefrom.

Figure 4 illustrates a fragmental sectional view showing the operation of tensioning the wire coil about a hose, and the rolling operation of the encircled article back and forth along the tensioned ends of the coiled staple; and Figure 5 illustrates a perspective view of a finished wire binder tightly clamping the hose ends upon a suitable bushing.

As illustrated in Figure 1, the preferred form of device for carrying out the method of this invention may include a suitable frame 6 preferably made of a casting, and having spaced bearings 7 and 8. The portion of the frame between the spaced bearings may have a section corresponding somewhat to an inverted T, thus providing a substantially horizontal surface 9 having an upwardly extending tongue or flange 10. The frame 6 may be provided with means for fastening the device to a table or bench as, for example, a suitable screw clamping means 11 may be suitably fastened to the frame or formed integral therewith, as illustrated.

A lead screw 12 may be journalled in the frame bearings 7 and 8 and may be provided with suitable turning means as, for example, the crank handle 13, which crank may be suitably mounted upon the lead screw and keyed thereto as by suitable key means 14. While the end of the lead screw opposite that to which the handle 13 is mounted may be extended through the bearing 7 and provided with a short threaded section 15, upon which threaded section one of the coiling rollers 16 may be screw threaded.

The frame bearing 7 may be provided with an outwardly extending section 17, to which the stub screw 18 may be mounted in parallel relation to the lead screw, and upon the stub screw a second but larger coiling roller 19 may be screw threaded.

It is to be understood that the coiling rollers 16 and 19 are interchangeable, that is, the small roller 16 may be screw threaded upon the stub screw 18 while the large roller 19 may be screw threaded upon the threaded section 15 of the lead screw so that different sized wire coils may be formed thereby.

It also should be understood that the peripheries of these coiling rollers do not engage one with the other; there should be a sufficient space therebetween for the thickness of the wire which is to be coiled to freely pass.

Other sets of rollers having different diameters may be provided for making wire coils of different sizes but each set of rollers should be so proportioned as to leave between the adjacent peripheries thereof a space slightly greater than the gage or thickness of wire to be coiled.

If the machine is to be operated for tightly clamping the hose ends 20 and 21 upon a tubular bushing 22 the first operation will be to form a section of wire, as illustrated in Figure 2, which for convenience will be referred to as the wire staple 23.

This wire staple 23 may be easily formed by hand or by means of an ordinary pair of pliers and the legs 24 and 25 should be of substantially equal length and the ends should be placed together in the center of the longitudinal slot 28 of the coiling roller 16. The large roller 19 may be provided with a similar wire receiving slot 29 for the same purpose.

After the straight ends of the staple have been placed within the slot of the roller, mounted upon the lead screw, which in this case is the small roller 16, the roller may be rotated in a counter clockwise direction, as viewed in Figures 1 and 2, by the handle 13. During the rotation of the small roller 16 to coil the staple, the large roller 19 will act as a guide to assist in the wire coiling operation. After the wire staple has been sufficiently coiled, it may be easily removed from the small roller by sliding the coil off the free end of the roller, whereupon the coiled staple may be taken and by means of a pair of pliers the hooked ends may be straightened out and the hooked portions severed therefrom, as illustrated in Figure 3. The severing operation may be accomplished by the cutting jaws of the pliers, previously referred to, or by any other suitable device or means. The straight ends of wire coil as shown in Figure 3 may be then inserted in holes 32 of the cross head 30 and bent back over cross head so that the looped end 36 thereof may be hooked over either or both of the horns 37 or 38. Next the coiled staple may be slid onto one hose end into which the bushing 22 has been placed. It should be understood, however, that, in place of the bushing, a single hose end may be slid onto the tubular portion of a hose coupling, or a threaded nipple or any other article to which the hose end is to be clamped, in which cases the wire binder may be fully mounted upon the end of the hose and would not straddle the hose ends, as illustrated in Figure 5.

Now the coiled staple is ready to be tightly drawn about the hose and for this purpose the frame 6 may be provided with a tensioning means, which may include a cross head 30 screw threaded upon the lead screw 12 and provided with a longitudinal groove 31 of such size as to nicely straddle the tongue section 10 of the frame and thus to prevent the cross head from turning with the lead screw. Adjacent the upper end thereof, the cross head may be provided with two or more unequally spaced longitudinal holes 32 of such diameter as to freely receive the straightened ends of the coiled staple; these straightened ends may be designated by numerals 33 and 34 (note Figure 3). The reason for providing more than two holes 32 in the cross head and unequally spacing these holes is for the purpose of obtaining different spacings for the coil ends 33 and 34, and correspondingly the horns 37 and 38 may be made of different widths to accommodate staple loops of different widths.

The next operation is to place the coil ends in the holes 32 selecting the two having the most appropriate spacing. The coil ends 33 and 34 may be projected into the holes 32 from the side of the cross head facing toward the coiling rollers, and during this operation the coils 35 of the coiled staple should be projecting downwardly, like in Figure 3, so that as the coiled staple with the hose is swung over to the position illustrated in Figure 4, the loops 35 of the coiled staple will be upwardly extending from the ends of the coil. During the swinging of the coils to the position of Figure 4, the ends 33 and 34 thereof are wrapped over the top surface of the cross head and thus these coil ends are securely fastened thereto. The looped end 36 of the coiled staple may be looped over either one or both of the two spaced horns 37 and 38 suitably mounted upon or formed integral with the top portion of bearing 8. The horns 37 and 38 may be of different widths so that there may be a selection of three different widths of tensioning horn as, for example, the loop may be hooked over the wide horn 37 or over the narrow horn 38 or a wide loop may be hooked over both horns.

After the opposite ends of the coiled staple are thus securely fastened, the handle 13 may be rotated to actuate the lead screw so as to force the cross head away from the horns. To start with, the cross head should be screwed reasonably close to the bearing 8 so as to allow sufficient distance for the cross head to travel during the tensioning of the wire about the hose. After the wire has been pulled rather tightly, the hose should be rolled back and forth along the tensioned straight portions of the wire as, for example, the hose may be rolled along the staple from its full line position to its broken line position, as illustrated in Figure 4, and then back again. This rolling of the hose along the tensioned staple allows the coils thereof to be tightly and evenly tensioned around the periphery of the hose. If the hose is not so rolled, the friction of the wire coils surrounding the hose will be sufficient to prevent the proper tensioning thereof. After the rolling operation, the handle may be actuated to further tension the staple and again the hose should be rolled back and forth; this process may be repeated until the desired tension has been placed in all of the coils surrounding the hose. This method of tensioning the coils about the hose places such an even compression around the full periphery thereof that the hose is not buckled or cut, even though the diameter of the hose be greatly reduced while being tightly clamped upon a bushing of very much smaller diameter than the internal diameter of the hose.

After the desired tension has been placed in the coils 35, the object being bound is then rolled completely over the front end of horns 37 and 38, thereby crimping the legs of the staple over the looped portion thereof and thereby effectively locking the wire binding so as to prevent the tension placed therein from being released, whereupon the ends 33 and 34 may be cut off and crimped as illustrated in Figure 5, to complete the binding operation.

In Figure 5 one coiled staple has been used to tightly clamp the abutted hose ends 20 and 21 upon the bushing 22; however, each hose end could be just as easily provided with a separate coiled staple.

Although the preferred mode of operation and apparatus particularly well adapted for the performance of the method have been illustrated and described, it is to be understood that changes and modifications other than those pointed out herein may be made and that all such changes and modifications, including those illustrated and described, will come within the scope of the appended claims and are embraced thereby.

I claim:

1. A method for wire binding an object including the following steps; forming an elongated wire staple, coiling the wire staple, placing an object to be bound within the coils of the staple, tensioning the staple, and rolling the encircled object back and forth along the tensioned strands of the staple.

2. A method for wire binding an object including the following steps; forming an elongated wire staple, coiling the wire staple, placing an object to be bound within the coils thereof, tensioning the staple, rolling the encircled object along the tensioned strands thereof, and finally clamping the free ends of the staple through and about the looped end thereof.

3. A method for wire binding an object including the following steps: placing an object to be bound within the coils of a coiled staple, tensioning the staple, rolling the encircled object along the tensioned strands of the staple and finally crimping the free ends of the staple about the looped end thereof.

4. A method for wire binding an object including the following steps: placing an object to be bound within the coils of a coiled staple, tensioning the staple, rolling the encircled object along the tensioned strands of the staple, rolling the object over the end of the tensioning device for initially crimping the ends of the staple over the looped end thereof, severing the surplus wire from the free ends of the staple, and finally completing the crimping the several wire ends about the looped end of the staple.

5. A method for wire binding an object including the following steps, forming an elongated wire staple, coiling the wire staple, placing the object to be bound within the coils of the staple, tensioning the staple, rolling the encircling object back and forth along the tensioned strands of the staple, further tensioning the staple and again rolling the encircled object until the portion of the staple surrounding the object has been tensioned to a desired degree, and finally clamping the free ends of the staple through and about the looped end thereof.

6. A method of tightly binding an object with wire including the following steps, encircling the object with one or more loops of wire, pulling the free ends of the wire coil or coils taut, rolling the object along the taut wire for tensioning the coiled loops tightly about the object, to again tension the wire, to again roll the object along the taut wire for further tensioning the coiled loops, to repeat the tensioning and rolling operations as many times as may be necessary to draw the coiled loops about the object to a desired tension, to crimp or lock the free ends of the wire strands together contiguous with the coiled portions thereof, and to sever the surplus wire ends.

7. A method of tightly binding an object with wire including the following steps; forming an elongated staple, coiling the strands of the staple into spiral coils having opposed directions of lead, pulling the looped and strand ends of the staple taut for tensioning the coils thereof about the object, rolling the object along the taut wire strands of the staple for tensioning the spiral coils tightly about the object, repeating the pulling and rolling steps as many times as necessary to draw the spiral coils to a desired tension about the object, and finally crimping the strands about the looped end of the staple.

8. A method of tightly binding an object with wire including the following steps, forming an elongated staple, coiling the strands of the staple into spiral coils having opposed directions of lead, pulling the looped and strand ends of the staple taut for tensioning the coils thereof about the object, rolling the object along the taut wire strands of the staple for tensioning the spiral coils tightly about the object, repeating the pulling and rolling steps as many times as necessary to draw the spiral coils to a desired tension about the object, crimping the strands about the looped end of the staple, and finally severing the surplus ends from the crimped staple.

9. A method of tightly binding an object with wire including the following steps, encircling an object with one or more loops of wire, pulling the free ends of the wire coil or coils taut, and rolling the object along the taut wire for tensioning the coiled loops tightly about the object.

10. A method of tightly binding an object with wire including the following steps, encircling an object with one or more loops of wire, pulling the free ends of the wire coil or coils taut, rolling the object along the taut wire for tensioning the coiled loops tightly about the object, and crimping or locking the free ends of the wire strands together to maintain the coil or coils tightly tensioned about the object.

JESSE A. BENT.